(12) United States Patent
Mahmoud et al.

(10) Patent No.: US 11,981,211 B2
(45) Date of Patent: May 14, 2024

(54) ELECTRIC POWER SYSTEM

(71) Applicant: Ningbo Geely Automobile Research & Development Co., Ltd., Ningbo (CN)

(72) Inventors: Heza Mahmoud, Västra Frölunda (SE); Fadi Almoosawi, Gothenburg (SE); Thomas Klintberg, Lindome (SE)

(73) Assignee: Ningbo Geely Automobile Rese arch & Dev. Co., Ltd., Ningbo (CN)

( * ) Notice: Subject to any disclaimer, the term of this patent is extended or adjusted under 35 U.S.C. 154(b) by 550 days.

(21) Appl. No.: 17/203,176

(22) Filed: Mar. 16, 2021

(65) Prior Publication Data

US 2021/0206275 A1 Jul. 8, 2021

Related U.S. Application Data

(63) Continuation of application No. PCT/CN2019/111155, filed on Oct. 15, 2019.

(30) Foreign Application Priority Data

Oct. 16, 2018 (EP) .................................... 18200712

(51) Int. Cl.
*B60L 1/00* (2006.01)
*B60L 3/00* (2019.01)
*B60R 16/033* (2006.01)
*F02N 11/08* (2006.01)
(Continued)

(52) U.S. Cl.
CPC ............. *B60L 1/003* (2013.01); *B60L 3/0092* (2013.01); *B60R 16/033* (2013.01); *F02N 11/0866* (2013.01); *H02J 7/345* (2013.01); *H02P 1/18* (2013.01); *F02N 2011/0885* (2013.01); *F02N 2011/0888* (2013.01)

(58) Field of Classification Search
CPC ...... B60L 1/003; B60L 3/0092; B60R 16/033; F02N 11/0866; F02N 2011/0885; F02N 2011/0888; H02J 7/345; H02P 1/18; B62D 1/184
See application file for complete search history.

(56) References Cited

U.S. PATENT DOCUMENTS

| | | | |
|---|---|---|---|
| 2006/0145536 A1 | 7/2006 | Hackl | |
| 2018/0029545 A1* | 2/2018 | Mohrmann | ............ B60R 16/033 |
| 2020/0063705 A1* | 2/2020 | Isaranggulnaayudhya | .................. F02N 11/0866 |

FOREIGN PATENT DOCUMENTS

| | | |
|---|---|---|
| CN | 104937825 A | 9/2015 |
| CN | 106058998 A | 10/2016 |
| CN | 106541910 A | 3/2017 |

(Continued)

OTHER PUBLICATIONS

Warm et al.; Dual battery systems for 12-V automotive power supply; Lead-Acid Batteries for Future Automobiles; Copyright © 2017 Elsevier; pp. 443-461 (Year: 2017).*

(Continued)

*Primary Examiner* — Michael J Zanelli
(74) *Attorney, Agent, or Firm* — Tucker Ellis LLP (57) ABSTRACT

An electric power system for a vehicle having an advanced driver assistance system (ADAS). The electric power system includes a first power source arranged for supplying electric power to the ADAS. The electric power system includes a second power source arranged for supplying electric power to the ADAS.

22 Claims, 6 Drawing Sheets

(51) Int. Cl.
   *H02J 7/34*      (2006.01)
   *H02P 1/18*      (2006.01)

(56)          References Cited

FOREIGN PATENT DOCUMENTS

CN       107482761 A      12/2017
CN       107662563 A       2/2018
DE     102006010713 A1 *   9/2007   ............ H02J 7/1415
DE     102009012734 A1     9/2010
EP         1555185 A1      7/2005
EP         3254883 A1     12/2017
JP        2017165249 A     9/2017

OTHER PUBLICATIONS

Karden; Development trends for future automobiles and their demand on the battery; Lead-Acid Batteries for Future Automobiles; Copyright © 2017 Elsevier; pp. 3-25 (Year: 2017).*
International Search Report from corresponding International Application No. PCT/CN2019/111155 dated Jan. 15, 2020, 2 pages.

* cited by examiner

ELECTRIC POWER SYSTEM

RELATED APPLICATION DATA

This application is a continuation of International Patent Application No. PCT/CN2019/111155, filed Oct. 15, 2019, which claims the benefit of European Patent Application No. 18200712.0, filed Oct. 16, 2018, the disclosures of which are incorporated herein by reference in their entireties.

TECHNICAL FIELD

The invention relates to an electric power system for a vehicle having an advanced driver assistance system (ADAS), and to a vehicle having an advanced driver assistance system and such an electric power system.

BACKGROUND

Modern vehicles often have advanced driver assistance systems for helping the driver in the driving process for safety and better driving. Such a system having functions involved during an autonomous driving mode, such as for example Active Safety Domain Master (ASDM) and Electric Power Assisted Steering (EPAS), has to be robust and be able to work at least during the time it takes to perform the requisite maneuvers for reaching a safe state in case of an error in the system. Since the time to reach a safe state in the event of a worst case scenario is hard to predict, this in turn makes the work of dimensioning a battery supplying power to the system very difficult.

SUMMARY

An objective of the invention is to provide an electric power system for a vehicle having an advanced driver assistance system, which electric power system will enable an improved safety.

The objective is achieved by an electric power system for a vehicle having an advanced driver assistance system (ADAS), wherein the electric power system comprises a first power source arranged for supplying electric power to the ADAS, and the electric power system comprises a second power source arranged for supplying electric power to the ADAS.

The invention is based on the insight that by such a system, the dimensioning of the battery is less critical since the power supply is secured even if an error should occur in one of the power sources or corresponding circuit. For example, the first power source can be a DC-to-DC converter for converting a first voltage to a second lower voltage supplied to the ADAS, and the second power source can be another DC-to-DC converter for converting a first voltage to a second lower voltage supplied to the ADAS.

Functions associated with the electric loads of the ADAS can be one or more of the following: Primary braking actuator, Secondary braking actuator, Primary steering actuator, Secondary steering actuator, Primary calculation unit, Secondary calculation unit, Primary front sensing unit (radar or visual) and Secondary front sensing unit (radar or visual). However, it should be clear to the skilled engineer of the field that the list is not exhaustive as there are further sensors to monitor surrounding (360 degrees) traffic and infrastructure as well as other actuators, such as belt pretensioner, accelerator, lighting, suspension, etc. that may be applicable to implement ADAS functionality.

According to one embodiment of the system, the first power source is arranged for supplying power to at least one electric load of the ADAS and the second power source is arranged for supplying electric power to said at least one electric load. Hereby, the function associated with the electric load can be secured even if the first power source or the second power source for some reason could not supply power.

For example, said at least one electric load can be an electric control unit controlling a steering actuator function of the ADAS or an electric control unit controlling a front sensing function of the ADAS.

According to a further embodiment of the system, the first power source is arranged for supplying power to a first electric load of the ADAS and the second power source is arranged for supplying power to a second load of the ADAS. Hereby, at least one of a first function associated with the first electric load and a second function associated with the second electric load can be secured even if the first power source or the second power source for some reason could not supply power.

For example, the first electric load can be an electric control unit controlling a primary braking actuator function of the ADAS and the second electric load can be a control unit controlling a secondary braking actuator function of the ADAS, or the first electric load can a primary calculation unit for providing actuation based on input from a primary sensor of the ADAS and the second electric load can be a secondary calculation unit for providing actuation based on input from a secondary sensor of the ADAS. In this context it may be understood that a calculation unit for providing actuation based on input from a sensor of the ADAS, may provide actuation for example as a data signal sent to other vehicular control units to or as a controlling voltage to a pump, motor, solenoid, etc.

According to a further embodiment, the electric power system has an electric battery, wherein the electric battery is arranged to be charged by the first power source and for supplying electric power to the ADAS. Hereby, an energy storage capacity for the energy supply from the first power source is achieved. The battery can be used during peak loads and if the first power source fails.

According to a further embodiment, the electric power system has an electric battery, the electric battery being arranged to be charged by the second power source and for supplying electric power to the ADAS. Hereby, an energy storage capacity for the energy supply from the second power source is achieved. The battery can be used during peak loads and if the second power source fails.

According to a further embodiment, the electric power system has a super capacitor arranged to be charged by the first power source and for supplying electric power to a starter motor of the vehicle. Hereby, the starter motor can be powered during driving of a vehicle while not affecting the voltage stability of the remaining electric system.

According to a further embodiment, the electric power system comprises a super capacitor module, the super capacitor module comprising a super capacitor and a first switch. Hereby, the super capacitor can be connected and disconnected for charging.

According to a further embodiment, the super capacitor module is configured to control the first switch to connect the super capacitor to the first power supply line when a voltage of the super capacitor is below a threshold value. Hereby, the super capacitor can be charged by the first power source.

According to a further embodiment, the super capacitor is charged by the first power source while being connected to the first power supply line.

According to a further embodiment, the super capacitor module is configured to control the first switch to disconnect the super capacitor from the first power supply line when the super capacitor has been charged to a predetermined level. Hereby, the super capacitor is not overcharged and is not unnecessarily worn.

According to a further embodiment, the super capacitor module further comprises a second switch. Hereby, the super capacitor can be connected and disconnected to a starter motor.

According to a further embodiment, the super capacitor module is configured to control the second switch to connect the super capacitor to the starter motor when a connect request is received. Hereby, the super capacitor can be utilized to power a starter motor.

According to a further embodiment, the super capacitor module is configured to control the second switch to connect the super capacitor to the starter motor when a connect request is received only if the super capacitor has a voltage level higher than a first voltage threshold value. Hereby, the super capacitor is only utilized when it is sufficiently charged.

According to a further embodiment, the connect request is received from a control unit, such as a control unit for stop-start of the vehicle. Hereby, the starter motor can be powered by the super capacitor during driving of a vehicle, such as when starting up the vehicle after a stop at a red light without affecting the voltage stability of the remaining electric system.

According to a further embodiment, the super capacitor module is configured to control the second switch to disconnect the super capacitor from the starter motor when a disconnect request is received. Hereby the super capacitor is only connected to the starter motor when needed and can be charged instead of being connected to the starter motor.

According to a further embodiment, the disconnect request is received from a control unit, such as a control unit for stop-start of the vehicle.

According to a further embodiment, the disconnect request is received when the control unit has determined that an internal combustion engine of the vehicle is running. Hereby, the super capacitor is only connected to the starter motor when needed to start an internal combustion engine and can be charged instead of being connected to the starter motor.

According to another aspect of the invention, a further objective is to provide a vehicle comprising an advanced driver assistance system and an electric power system.

The advantages of the vehicle are substantially the same as the advantages already discussed hereinabove with reference to the different embodiments of the electric power system.

Further advantages and advantageous features of the invention are disclosed in the following description and the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
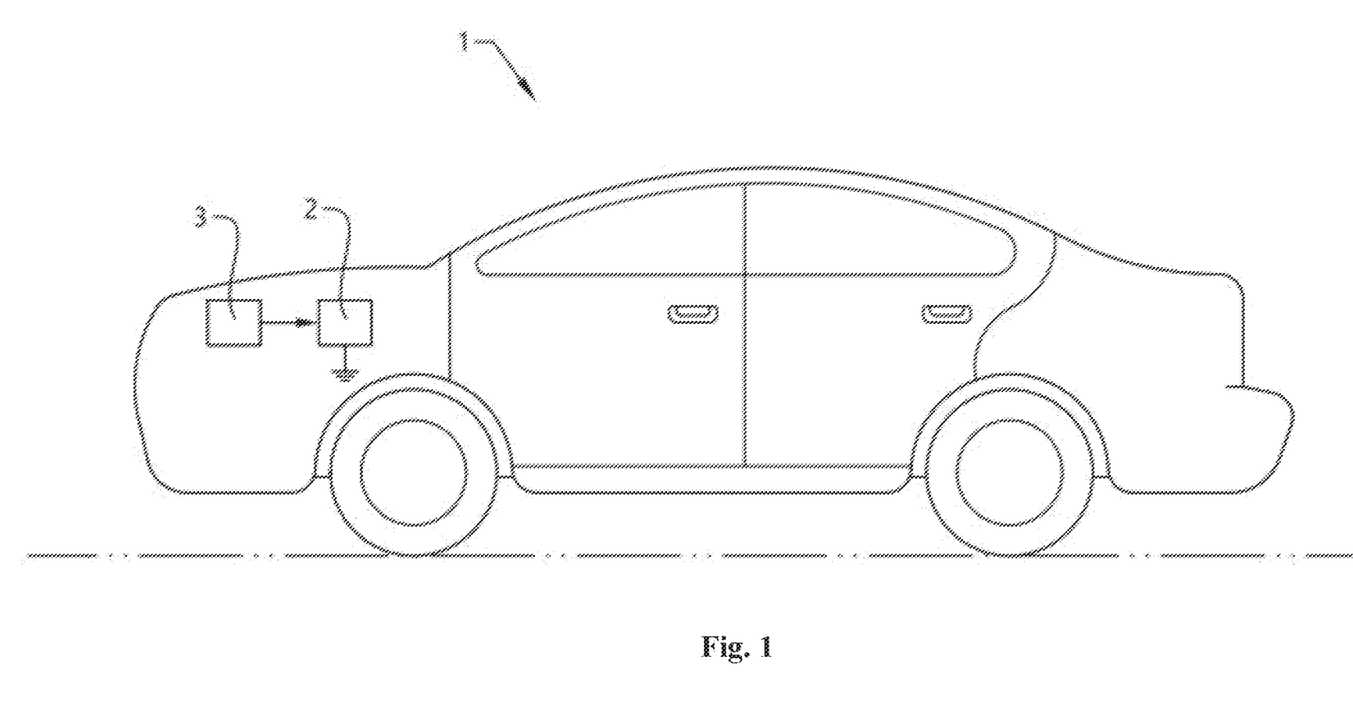
FIG. 1 shows a vehicle comprising an advanced driver assistance system and an electric power system.

FIG. 1 shows a vehicle 1 having an advanced driver assistance system (ADAS) 2 and an electric power system 3. The electric power system 3 will be further described herein below with reference to FIGS. 2-6. As schematically indicated in FIG. 1, the electric power system 3 supplies electric power to the ADAS 2.

Figure 2:
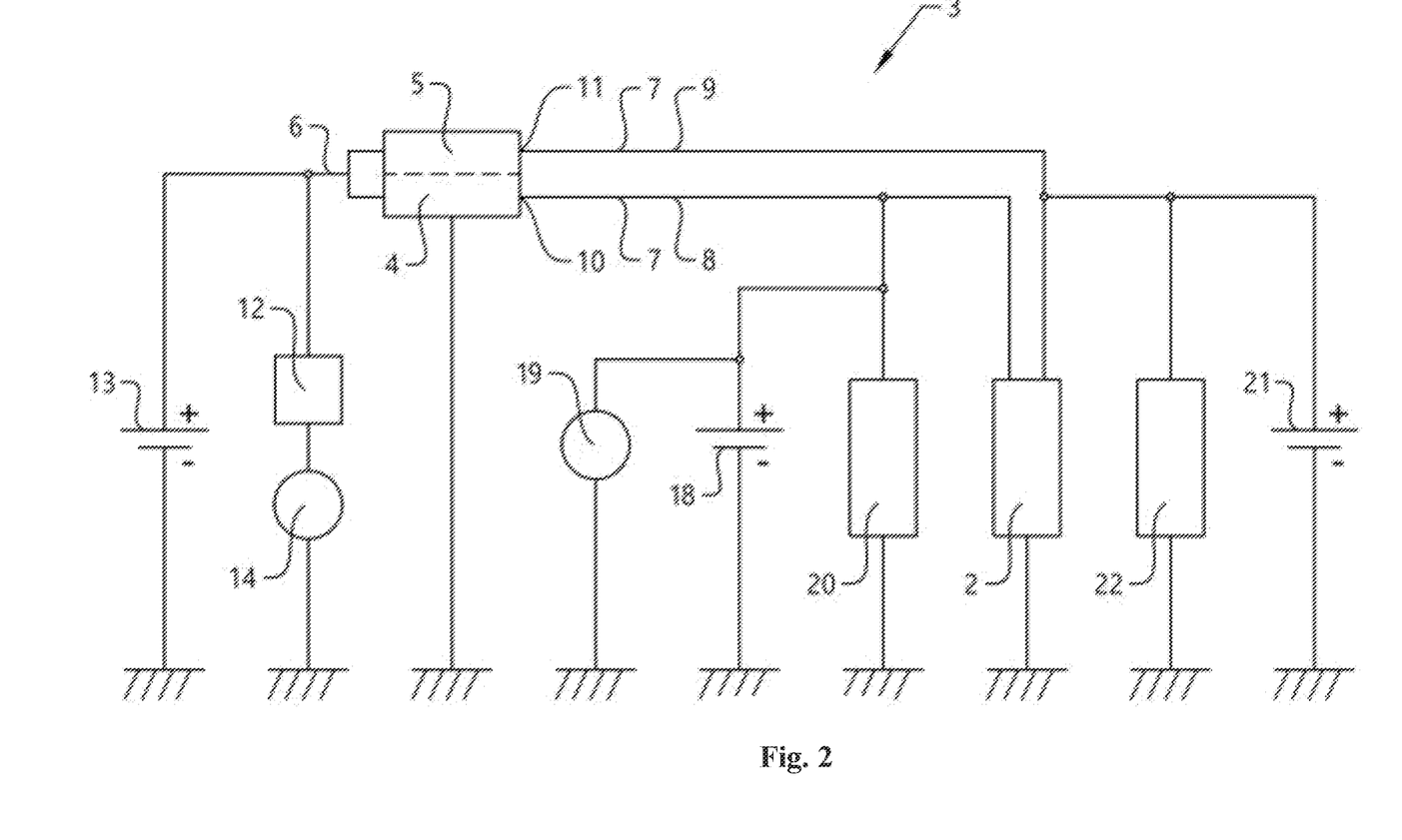
FIG. 2 shows a circuit diagram of the electric power system in FIG. 1.

FIG. 2 shows the electric power system 3 for the vehicle in FIG. 1 illustrated by a circuit diagram. As mentioned, the vehicle has an advanced driver assistance system 2 powered by the electric power system 3. The electric power system 3 comprising a first power source 4 arranged for supplying electric power to the ADAS 2 and a second power source 5 arranged for supplying electric power to the ADAS 2. In the example embodiment illustrated in FIG. 2, the first power source 4 is a DC-to-DC converter and the DC-to-DC converter is arranged for converting a first voltage 6 to a second lower voltage 7 supplied to the ADAS 2. Further, the second power source 5 is a DC-to-DC converter and the DC-to-DC converter is arranged for converting a first voltage 6 to a second lower voltage 7 supplied to the ADAS 2. Preferably, the first power source and the second power source provide the same voltage level. For example, the voltage can be converted from the first higher voltage 6 to the second lower voltage 7 being 12V.

The first power source 4 and the second power source 5 are independent of each other for supplying power independently to the ADAS 2. The first power source 4 is electrically connected to the ADAS 2 by a first power supply line 8 and the second power source 5 is electrically connected to the ADAS 2 by a second power supply line 9.

The ADAS 2 can comprise one or more functions and electric loads associated to the functions. The detailed architecture and components of ADAS, such as actuators, control units and sensors, are not further described hereinafter, since these should be known by the person skilled in the art.

Thus, one or more ADAS-loads can be connected between the voltage level provided by the power sources and earth.

By the expression independent power sources is meant that each power source 4, 5 has an output for supplying electric power. In the example embodiment illustrated in FIG. 2, the first power source 4 has an output 10 providing a voltage of 12V on the first power supply line 8, and the second power source 5 has another output 11 providing a voltage of 12V on the second power supply line 9. The power sources 4, 5 can be arranged in two components separated from each other or as one component as long as two separate outputs are provided where the first output can supply power even if an error should occur in the second power source and the second output can supply power even if an error should occur in the first power source. For example, the power sources 4, 5 can be arranged in a common housing on two separate circuit boards or separated on a single circuit board or in separate housings.

Further, if the first power source 4 is a DC-to-DC converter and the second power source 5 is a DC-to-DC converter, the converters can be powered by the same power source 12 providing the first higher voltage 6, or the converters can be powered by two separate power sources each providing the first higher voltage. In the example embodiment illustrated in FIG. 2, the DC-to-DC converters are powered from an AC-to-DC converter 12 and from a battery 13 arranged to be charged by the AC-to-DC converter 12. The AC-to-DC converter is in turn powered by an electric (starter) generator 14 such as for example a BSG or ISG. The first higher voltage 6 that constitutes input to the DC-to-DC converters can be for example 400V or 48V.

Figure 3A:
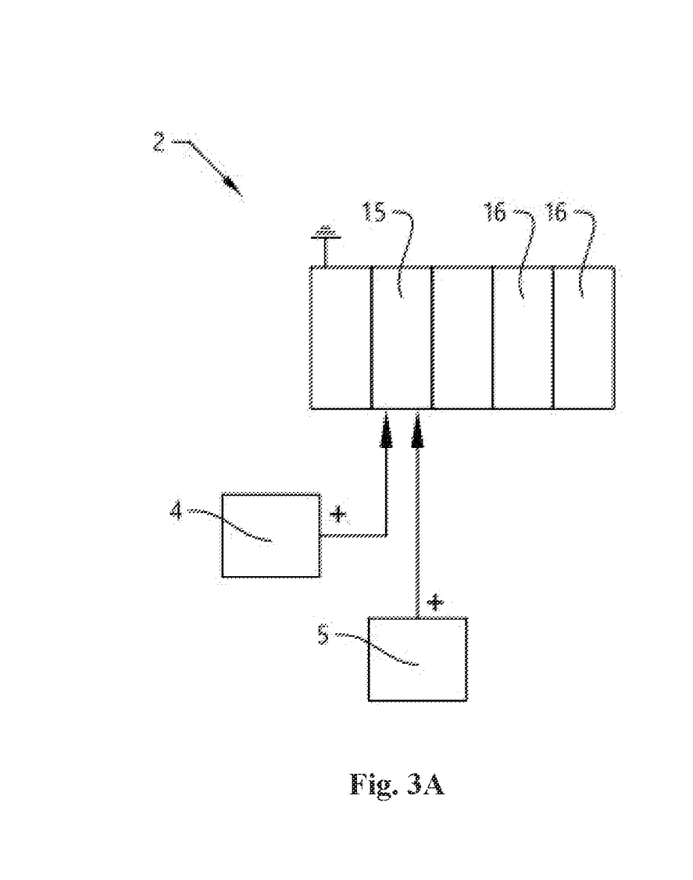
FIG. 3A shows a schematic view of a load of ADAS supplied by both a first power source and a second power source.

FIG. 3A shows in a schematic view an example embodiment of the system where the first power source 4 is arranged for supplying power to at least one electric load 15 of the ADAS 2 and the second power source 5 is arranged for supplying electric power to said at least one electric load 15. In this way power supply redundancy can be achieved for the electric load 15 and the function associated with the electric load 15, since the electric load is electrically connected to both the first power source 4 and the second power source 5 by the first power supply line 8 and the second power supply line 9, respectively. Optionally, the ADAS can comprise further electric loads 16 powered by the first power source and/or the second power source.

Figure 3B:
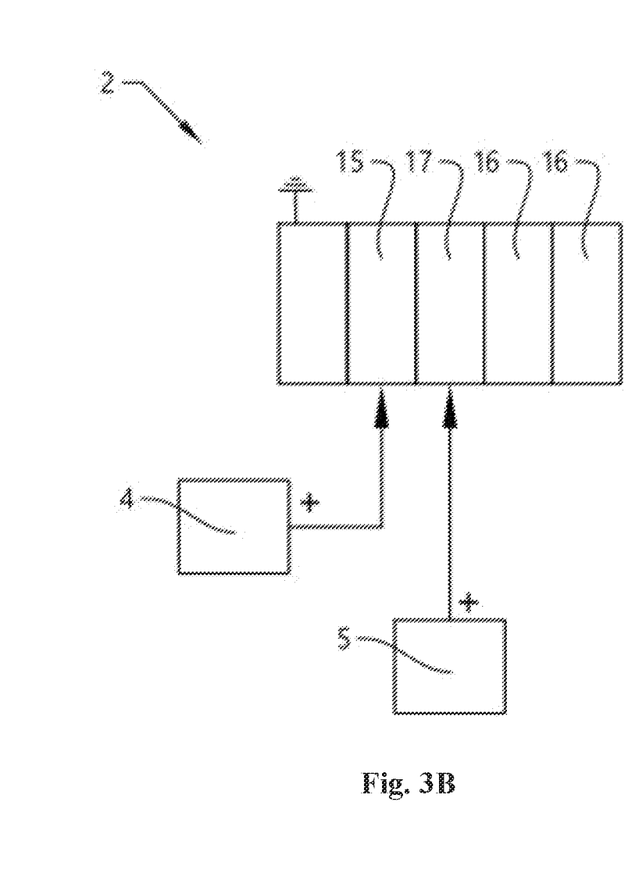
FIG. 3B shows a schematic view of two loads of ADAS supplied by a first power source and a second power source, respectively.

FIG. 3B shows in a schematic view an example embodiment of the system where the first power source 4 is arranged for supplying power to a first electric load 15 of the ADAS and the second power source 5 is arranged for supplying power to a second load 17 of the ADAS 2. The first electric load 15 and the second electric load 17 are associated with a first function and a second function, respectively. The first function and the second function have at least partly overlapping characteristics, or the first function and the second function are two functions of the same type. In this way function redundancy can be achieved, since the first load 15 is electrically connected to the first power source 4 by the first power supply line 8 and the second electric load 17 is electrically connected to the second power source 5 by the second power supply line 9. Optionally, the ADAS can comprise further electric loads 16 powered by the first power source and/or the second power source.

With further reference to FIG. 2, the electric power system 3 has a first electric battery 18, which is arranged to be charged by the first power source 4. The first battery 18 is arranged for supplying electric power to the ADAS 2. The first battery 18 can also be used for supplying electric power to a starter motor 19 of the vehicle and/or any further load 20 not included in the ADAS. The electric power system 3 can also have a second electric battery 21 that is arranged to be charged by the second power source 5. The second battery 21 is arranged for supplying electric power to the ADAS 2. The second battery 21 can also be used for supplying electric power to any further load 22 not included in the ADAS.

Figure 4:
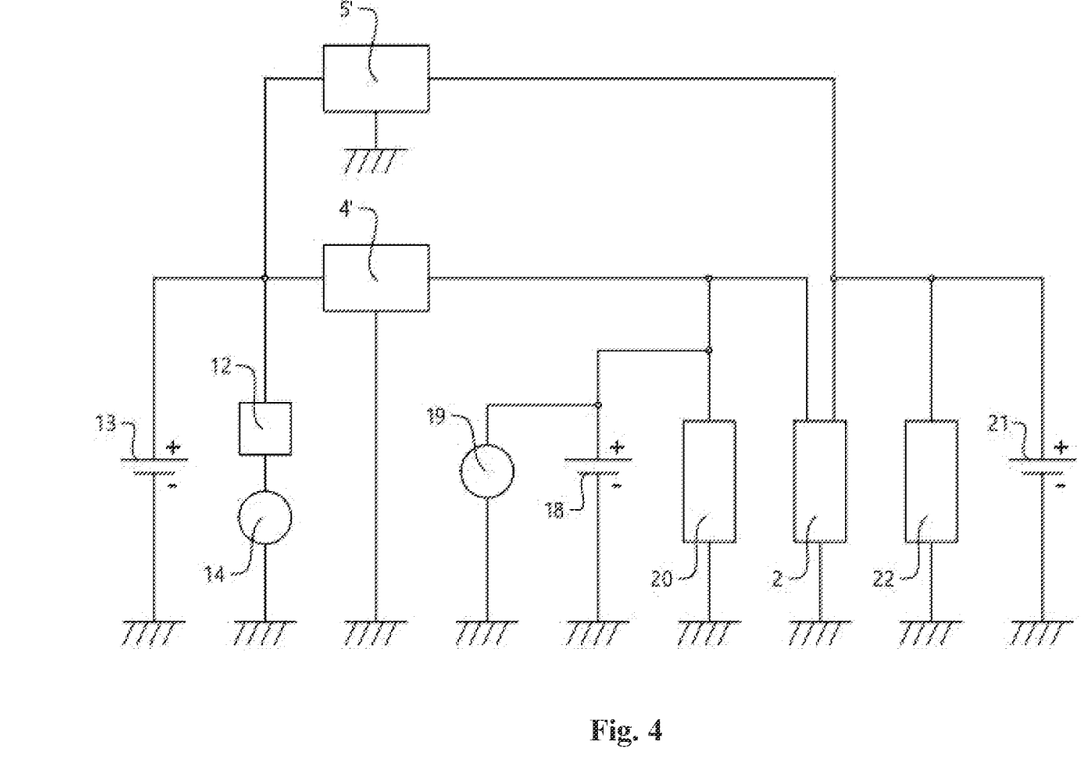
FIG. 4 shows a circuit diagram of a variant of the electric power system in FIG. 2.

FIG. 4 shows a circuit diagram of a variant of the electric power system. In this example embodiment the first power source 4' and the second power source 5' are separated from each other. As it regards remaining components, reference is made to the description of the electric power system illustrated in FIG. 2, and same reference numerals will indicate same or similar components.

Figure 5:
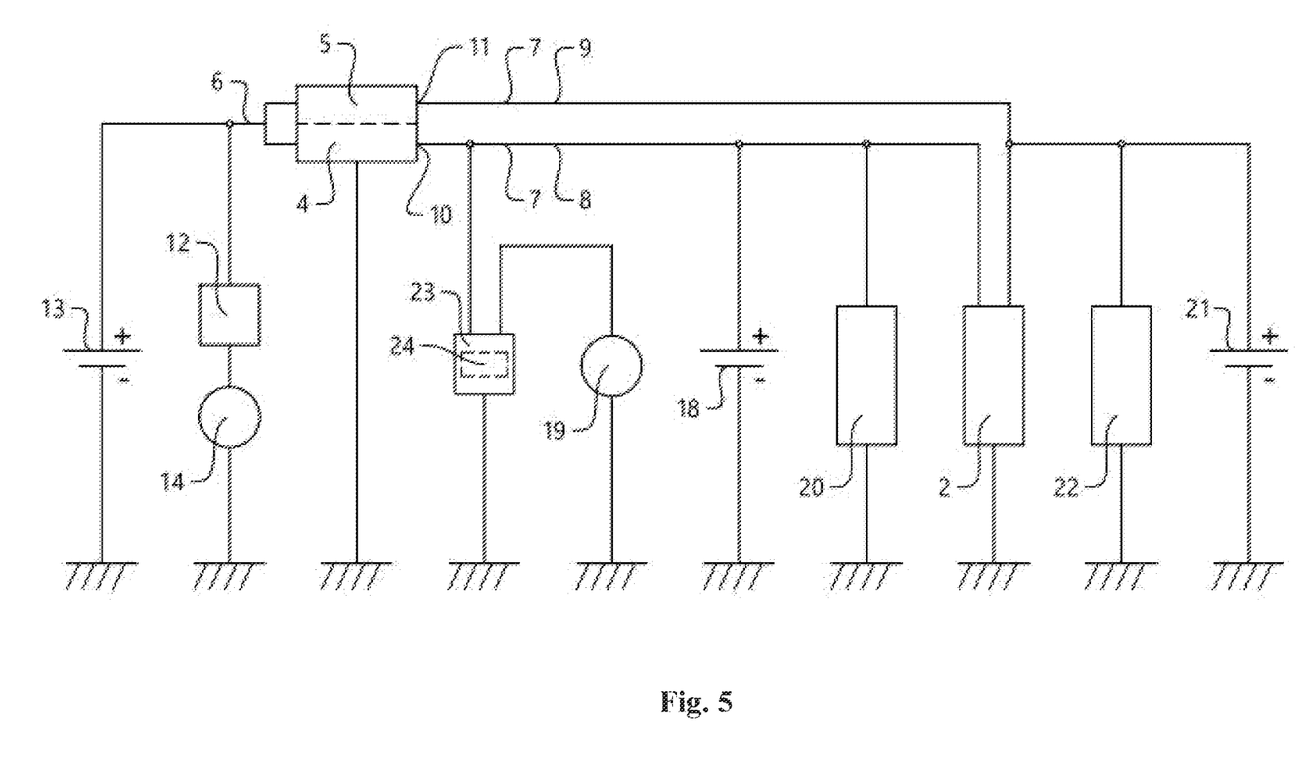
FIG. 5 shows a circuit diagram of a further variant of the electric power system in FIG. 2.

FIG. 5 shows a circuit diagram of a further variant of the electric power system. In this example embodiment the system comprises a super capacitor module 23 with a super capacitor 24 and switches. The switches comprises a first switch 26 (shown in FIG. 6) and a second switch 28 (shown in FIG. 6). In some embodiments, further switches, such as a third switch and a fourth switch are utilized. The first switch 26 is for connecting and disconnecting the super capacitor 24 for charging. By the super capacitor module 23, the super capacitor 24 can be electrically connected to the first power supply line 8 to be charged by the first power source 4. In some embodiments, this is performed by configuring the super capacitor module 23 to control the first switch 26 to connect the super capacitor 24 to the first power supply line 8 when a voltage of the super capacitor 24 is below a threshold value. In some embodiments, a value below the threshold value indicates that the super capacitor 24 is not sufficiently charged. While the super capacitor 24 is connected to the first power source 4, the super capacitor 24 is charged by the first power source 4.

When the super capacitor 24 has been charged it can be disconnected from the first power supply line 8. In some embodiments, when the super capacitor 24 has been charged to a predetermined level, the super capacitor module 23 is configured to control the first switch 26 to disconnect the super capacitor 24 from the first power supply line 8. Hereby, the super capacitor 24 is not overcharged and unnecessarily worn. The charged super capacitor 24 can then be electrically connected to the starter motor 19 for supplying electric power to the starter motor 19 if requested. In some embodiments, the connection to the starter motor 19 is performed by the second switch 28. The super capacitor module 23 is then configured to control the second switch 28 to connect the super capacitor 24 to the starter motor 19 when a request, such as a connect request, is received. Hereby, the super capacitor 24 can be utilized to power the starter motor 19. In some embodiments, the super capacitor module 23 is configured to control the second switch 28 to connect the super capacitor 24 to the starter motor 19 when a connect request is received only if the super capacitor 24 has a voltage level higher than a first voltage threshold value. In some embodiments, such a voltage threshold value indicates that the super capacitor 24 is sufficiently charged. Hereby, the super capacitor 24 is only utilized to power the starter motor 19 when it is sufficiently charged.

In some embodiments, the connect request is received from a control unit, such as a control unit for stop-start of the vehicle. Hereby, the starter motor 19 can be powered by the super capacitor 24 during driving of a vehicle 1, such as when starting up the vehicle 1 after a stop, which may include a stop or turn off of the motor or engine, at a red light without affecting the voltage stability of the remaining electric system.

Furthermore, in some embodiments, the super capacitor module 23 is configured to control the second switch 28 to disconnect the super capacitor 24 from the starter motor 19 when a request, such as a disconnect request, is received. Hereby the super capacitor 24 is only connected to the starter motor 19 when needed and can at other times be charged instead of being connected to the starter motor 19. Such a disconnect request is, in some embodiments, received from a control unit, such as a control unit for stop-start of the vehicle.

In some embodiments, the disconnect request is received by the super capacitor module 23 from the control unit, when the control unit has determined that an internal combustion engine of the vehicle 1 is running. Hereby, the super capacitor 24 is only connected to the starter motor 19 when needed to start an internal combustion engine and can other times be charged instead of being connected to the starter motor 19.

Figure 6:
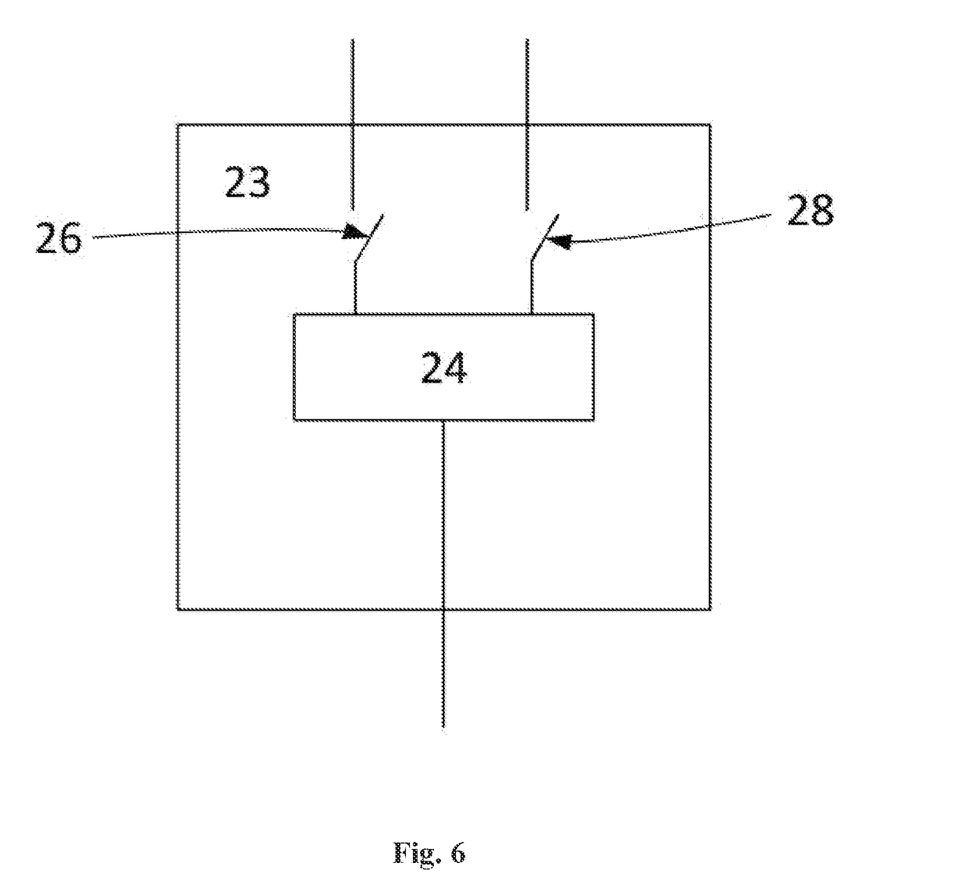
FIG. 6 shows a block diagram of a super capacitor module.

FIG. 6 shows a block diagram of a super capacitor module 23. The super capacitor module 23 comprises a super capacitor 24. Furthermore, the super capacitor module 23 comprises a first switch 26 having one end connected to a first end of the super capacitor 24 and the other end connected to the first power supply line 8. Moreover, the super capacitor module 23 comprises a second switch 28 having one end connected to the first end of the super capacitor 24 and the other end connected to the starter motor 19. The super capacitor 24 has a first end connected to the switches 26, 28 and a second end connected to common ground.

It is to be understood that the present invention is not limited to the embodiments described above and illustrated in the drawings; rather, the skilled person will recognize that many changes and modifications may be made within the scope of the appended claims.

What is claimed is:

1. An electric power system for a vehicle having an advanced driver assistance system (ADAS), the electric power system comprising a first power source arranged for supplying electric power to the ADAS, wherein the electric power system comprises a second power source arranged for supplying electric power to the ADAS, and the electric power system comprises a super capacitor arranged to be charged by the first power source and arranged to supply electric power to a starter motor of the vehicle.

2. The electric power system according to claim 1, wherein the system comprises a super capacitor module, the super capacitor module comprising the super capacitor and a first switch.

3. The electric power system according to claim 2, wherein the super capacitor module is configured to control the first switch to connect the super capacitor to a first power supply line when a voltage of the super capacitor is below a threshold value.

4. The electric power system according to claim 3, wherein the super capacitor is configured to be charged by the first power source while being connected to the first power supply line.

5. The electric power system according to claim 3, wherein the super capacitor module is configured to control the first switch to disconnect the super capacitor from the first power supply line when the super capacitor has been charged to a predetermined level.

6. The electric power system according to claim 2, wherein the super capacitor module further comprises a second switch.

7. The electric power system according to claim 6, wherein the super capacitor module is configured to control the second switch to connect the super capacitor to the starter motor.

8. The electric power system according to claim 6, wherein the super capacitor module is configured to control the second switch to connect the super capacitor to the starter motor only if the super capacitor has a voltage level higher than a first voltage threshold value.

9. The electric power system according to claim 7, wherein a connect request from a control unit for stop-start of the vehicle controls the second switch to connect the super capacitor to the starter motor.

10. The electric power system according to claim 6, wherein the super capacitor module is configured to control the second switch to disconnect the super capacitor from the starter motor.

11. The electric power system according to claim 10, wherein a disconnect request from a control unit for stop-start of the vehicle controls the second switch to disconnect the super capacitor to the starter motor.

12. The electric power system according to claim 11, wherein control unit for stop-start of the vehicle generates the disconnect request upon determination that an internal combustion engine of the vehicle is running.

13. The electric power system according to claim 1, wherein the first power source is arranged for supplying power to at least one electric load of the ADAS and the second power source is arranged for supplying electric power to said at least one electric load.

14. The electric power system according to claim 13, wherein said at least one electric load is an electric control unit controlling a steering actuator function of the ADAS.

15. The electric power system according to claim 14, wherein said at least one electric load is an electric control unit controlling a front sensing function of the ADAS.

16. The electric power system according to claim 1, wherein the first power source is arranged for supplying power to a first electric load of the ADAS and the second power source is arranged for supplying power to a second load of the ADAS.

17. The electric power system according to claim 16, wherein the first electric load is an electric control unit controlling a primary braking actuator function of the ADAS and the second electric load is a control unit controlling a secondary braking actuator function of the ADAS.

18. The electric power system according to claim 17, wherein the first electric load is a primary calculation unit for providing actuation based on input from a primary sensor of the ADAS and the second electric load is a secondary calculation unit for providing actuation based on input from a secondary sensor of the ADAS.

19. The electric power system according to claim 1, wherein the first power source and/or the second power source is a DC-to-DC converter.

20. The electric power system according to claim 19, wherein the DC-to-DC converter and/or the second power source is arranged for converting a first voltage to a second lower voltage supplied to the ADAS.

21. The electric power system according to claim 1, wherein the electric power system has an electric battery, the electric battery being arranged to be charged by the first power source or by the second power source and for supplying electric power to the ADAS.

22. A vehicle having an advanced driver assistance system (ADAS) and an electric power system according to claim 1.

* * * * *